United States Patent [19]

Yamada

[11] 4,060,804

[45] Nov. 29, 1977

[54] INK JET RECORDING METHOD AND APPARATUS

[75] Inventor: Takahiro Yamada, Hitachi, Japan

[73] Assignee: Hitachi, Ltd., Japan

[21] Appl. No.: 653,928

[22] Filed: Jan. 30, 1976

[30] Foreign Application Priority Data

Feb. 3, 1975 Japan .................................. 50-14505

[51] Int. Cl.$^2$ .............................................. G01D 15/18

[52] U.S. Cl. ........................................... 346/1; 346/75

[58] Field of Search ....................................... 346/75, 1

[56] References Cited

U.S. PATENT DOCUMENTS

| | | | |
|---|---|---|---|
| 3,298,030 | 1/1967 | Lewis et al. | 346/75 |
| 3,786,517 | 1/1974 | Krause | 346/75 |

*Primary Examiner*—Joseph W. Hartary

*Attorney, Agent, or Firm*—Craig & Antonelli

[57] ABSTRACT

In an ink jet recording method and an apparatus for forming an information pattern by synthesizing record patterns by ink droplets emitted from two ink ejection nozzles, a seam of the patterns is defined by those edges of the patterns which have been less deflected.

10 Claims, 8 Drawing Figures

INK JET RECORDING METHOD AND APPARATUS

BACKGROUND OF THE INVENTION

1. Field of the Invention

The present invention relates to an ink jet recording method and an apparatus, and more particularly to such a recording method and apparatus which are suitable for recording and reproducing a large size pattern.

2. Description of the Prior Art

Many patents have been known which concern ink jet recording method and/or apparatus. One typical apparatus is disclosed in the U.S. Pat. No. 3,596,275 to Richard G. Sweet, issued July 27, 1971. As is shown in FIGS. 1 and 12A of the patent, ink droplets 188 are deposited on a record sheet 186 to form a pattern while ink droplets 180 impinge a collector 182 and are recovered thereby. In this recording apparatus, the ink droplets are deflected upwardly and downwardly with respect to a direction of ejection from an ink ejection nozzle 176. In this type of recording apparatus, however, the formation of the ink droplets at a start-up stage is unstable and hence it is difficult to correctly control the deflection, which not only prevents proper pattern recording but also poses a problem of contamination by ejection outside the collector. Accordingly, it is practically advantageous to arrange the collector in the straight flight path of the ink droplets and deflect those ink droplets which are to be used for pattern recording outside a collector area to deposit the droplets onto the record sheet. In such a deflection system, however, the maximum amount of deflection is reduced to one half because the ink droplets can be deflected only in one direction with respect to a straight forward direction of the droplets.

SUMMARY OF THE INVENTION

It is an object of the present invention to provide an ink jet recording method and an apparatus which are suitable to reproduce a large size information pattern synthesized by two patterns.

It is another object of the present invention to provide an ink jet recording method and an apparatus which allow correct recording of the seam of two patterns.

It is a further object of the present invention to provide an ink jet recording method and an apparatus which are suitable to reproduce an information pattern by synthesizing patterns recorded by two ink ejection nozzles.

The present invention is characterized in that an information pattern is reproduced by seaming two patterns along those edges which have been recorded by ink droplets less deflected.

BRIEF DESCRIPTION OF THE DRAWINGS

FIGS. 5*a* to 5*d* show examples of sketchy versions of records by ink jet, in which FIG. 5*d* shows an example according to the present invention.

DETAILED DESCRIPTION OF THE PREFERRED EMBODIMENTS

Figure 1:
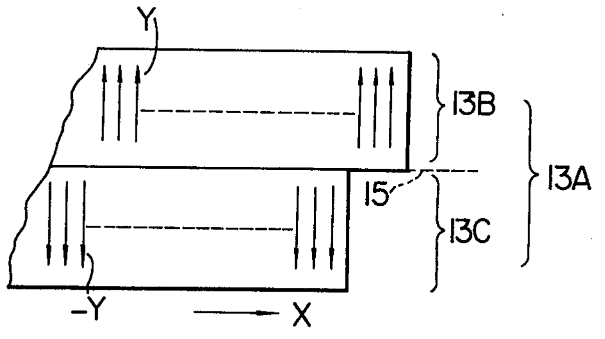
FIG. 1 shows a sequence of a record pattern formation in accordance with a recording method of the present invention.

Referring to FIG. 1, reference numeral 13A shows a recorded pattern with 13B representing a pattern formed by ink droplets emitted from a first ink ejection nozzle and 13C representing a pattern formed by ink droplets emitted from a second ink ejection nozzle. An arrow X shows the direction of nozzle movement, and the arrow Y shows the direction of deflection of the ink droplets ejected from the first nozzle while the arrow-Y shows the direction of deflection of the ink droplets ejected from the second nozzle. The seam of the patterns 13B and 13C is defined by the edges along a deflection base line 15, which edges are defined by the ink droplets less deflected.

Figure 2:
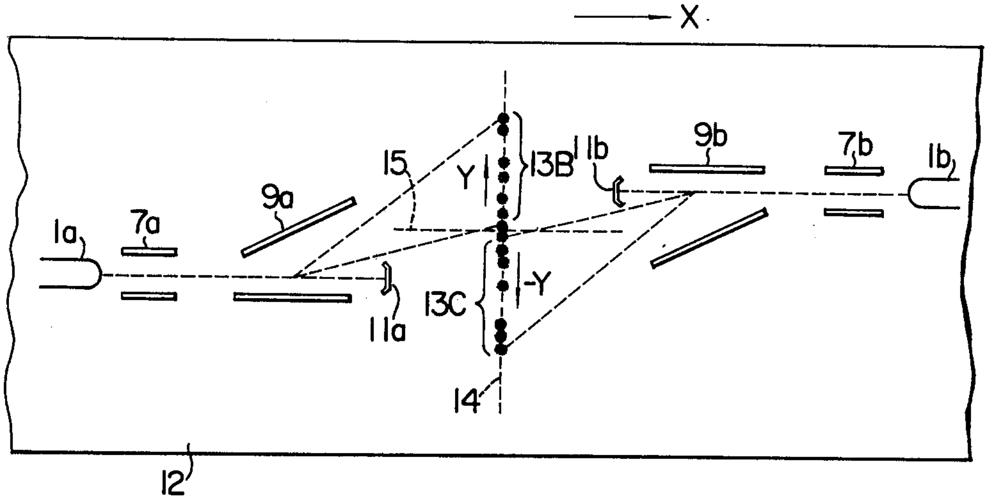
FIGS. 2 and 3 show respectively schematic plan and side elevational views of a recording apparatus of the present invention.
Figure 3:
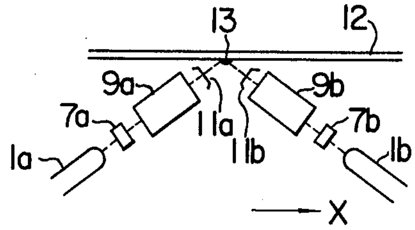
Figure 4:
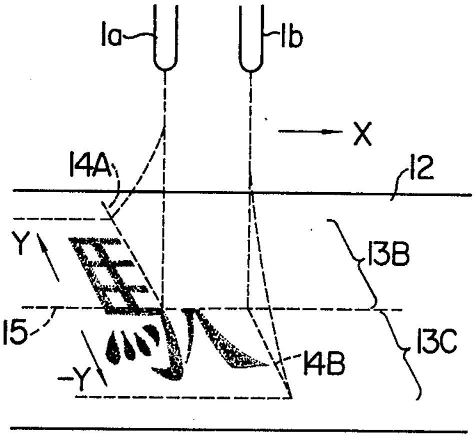
FIG. 4 shows a perspective view illustrating a recording mode in another embodiment of the present invention.

Referring now to FIGS. 2, 3 and 4, an ink ejection nozzle 1*a*, droplet charging electrodes 7*a*, droplet deflection electrodes 9*a* and an ink collector 11*a* constitute a first recording head assembly, and an ink ejection nozzle 1*b*, droplet charging electrodes 7*b*, droplet deflection electrodes 9*b* and an ink collector 11*b* constitute a second recording head assembly. Each of the head assemblies per se may be of a conventional type. The nozzles 1*a* and 1*b* jet pressurized ink from small orifices toward a record sheet 12. The charging electrodes 7*a* and 7*b* are arranged at such areas that they establish a static capacitance with the ink column and a leading edge of the ink column is broken while the static capacitance is charged in accordance with an information signal, to form an ink droplet. The deflection electrodes 9*a* and 9*b* are arranged on opposite sides of travel paths of the ink droplets, with the electrodes 9*a* functioning to deflect the ink droplets in the direction Y and the electrodes 9*b* functioning to deflect the ink droplets in the direction −Y. The collectors 11*a* and 11*b* are arranged at positions to enable collection of the ink droplets that travel straightforwards. The recording droplets having a mimimum deflection angle, which avoid the collectors 11*a* and 11*b* and are deposited onto the record sheet 12, form those dots which are in line with the deflection base line 15. Record dots are formed on a deflection scan line 14 by deflecting the droplets. A signal representing an information pattern to be recorded is divided into one corresponding to the first pattern 13B and one corresponding the second pattern 13C, and the divided signals are applied to the charging electrodes 7*a* and 7*b* respectively so that an information pattern can be reproduced by the synthesis of two patterns as shown in FIG. 4. The deflection scan for the first pattern 13B and that for the second pattern 13C may occur simultaneously or they may occur alternately. When simultaneous scans are effected, information signals are divided into two sections and stored in a memory and they are subsequently read out simultaneously. In the case of alternate scans, a distributor may be used to switch respective signals to the first and second patterns for each of the dots. Since the number of dots on one scan line is usually fixed, the distribution can be readily accomplished by the use of a counter.

Figure 5A:
Figure 5B:
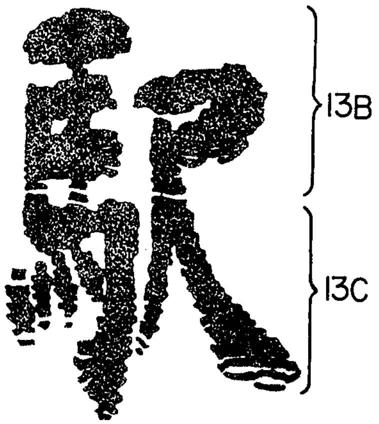
Figure 5C:
Figure 5D:
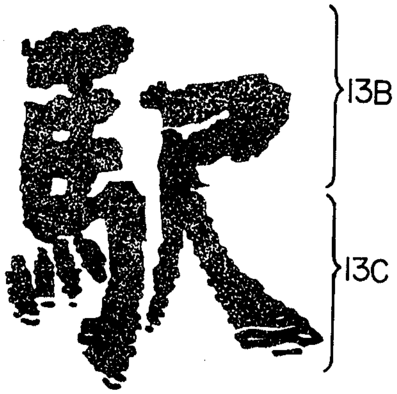

As is seen from the above description, since those edges of the patterns which are less deflected form the seam, the synthesized information pattern exhibits a clear format because those edges include less deflection distorsion and hence the seam is precisely defined. This will be clear from the comparison of FIGS. 5*a* to 5*d*, in which FIG. 5*d* shows a pattern recorded in accordance with the present method. It is seen that the seam of the first pattern 13B and the second pattern 13C is correctly recorded. It should be noted that the record patterns shown in FIGS. 5*a* to 5*d* are sketchy versions and the actual pattern is a gather of dots as shown in FIGS. 2 and 3.

While the deflection scan of the ink droplets is made in the above embodiment in the direction starting from a smaller deflection angle to a larger deflection angle, the same effect is attained when the deflection is made in the direction starting from larger deflection angle to smaller deflection angle provided that the seam is formed by the dots recorded by smaller deflection angle.

Regarding the physical arrangement of the two record heads, while they are arranged in FIGS. 2 and 3 such that the dots are formed on the deflection scan line 14, they may be arranged such that, as shown in FIG. 4, a scan line 14A for the first pattern 13B and a scan line 14B for the second pattern 13C are split. In the arrangement of FIG. 4, the heads can be mounted perpendicularly to a plane of the record sheet because sufficient mounting spaces for the heads can be allowed, whereas in the arrangements of FIGS. 2 and 3 the heads should be mounted obliquely. In any case, the heads can be arranged without blocking each other while permitting the formation of the patterns having their edges aligned together.

I claim:

1. An ink jet recording method for recording a continuous pattern by the synthesis of two record patterns split in a direction of deflection of ink droplets, wherein said two split record patterns are formed by deflecting first ejected ink droplets and second ejected ink droplets individually from each other and respectively in opposite senses of the ink droplet deflection direction, and said two split record patterns are seamed together along their edges which are defined by the ink droplets deflected with a smaller angle.

2. An ink jet recording apparatus comprising two record heads, each of said two record heads including an ink nozzle for ejecting ink droplets therefrom, ink droplet deflection means for deflecting the ejected ink droplets only in a deflection area of one side with respect to a direction of ejection of the ink droplets and a collector for collecting non-deflected ink droplets, wherein said two record heads are arranged such that record dots adjacent to a deflection base line are formed by the ink droplets deflected with a smaller angle by said two record heads respectively, and said deflection areas of said two record heads are opposite to each other with respect to said deflection base line.

3. An ink jet recording apparatus according to claim 2, wherein said two record heads are arranged at different angles from each other such that deflection scan lines in said deflection areas of said two record heads are in a line.

4. An ink jet recording apparatus according to claim 2, wherein said two record heads are arranged perpendicularly to a plane of a record sheet to define deflection scan lines which are staggered in a direction perpendicular to the direction of deflection of the ink droplets.

5. An ink jet recording apparatus according to claim 2, wherein said two record heads are arranged opposite to a plane of a record sheet at locations staggered in a direction perpendicular to the direction of deflection of the ink droplets.

6. An ink jet recording method for recording a continuous pattern by the synthesis of first and second record patterns split in a direction of deflection of ink droplets, wherein said first record pattern is formed by a first record head to control the deflection of first ejected ink droplets in a deflection area of one side with respect to a direction of ejection of said first ink droplets, said second pattern is formed by a second record head to control the deflection of second ejected ink droplets in a deflection area of one side with respect to a direction of ejection of said second ink droplets, said deflection areas of said first and second record heads being opposite to each other, and said first and second split record patterns are seamed together along their edges which are defined by those ink droplets of said first and second ink droplets which are deflected with a smaller angle by said first and second record heads, respectively.

7. An ink jet method of recording a prescribed pattern on a recording medium comprising the steps of:

a. directing a first stream of ink droplets toward a first portion of said recording medium and controllably deflecting said first stream of ink droplets in a first angular direction so as to cause the ink droplets in said first stream to be deposited on only said first portion of said recording medium;

b. directing a second stream of ink droplets toward a second portion of said recording medium and controllably deflecting said second stream of ink droplets in a second angular direction, opposite to said first angular direction, so as to cause the ink droplets in said second stream to be deposited only on said second portion of said recording medium; and wherein an edge of said first portion of said recording medium abuts an edge of said second portion of said recording medium, and said first and second streams of ink droplets are deflected in such a manner that those ink droplets of said first stream which have been controllably deflected through the smallest angle of deflection for said first stream are deposited along said edge of said first portion of said recording medium, and those ink droplets of said second stream which have been controllably deflected through the smallest angle of deflection for said second stream are deposited along said edge of said second portion of said recording medium, whereby said prescribed pattern is recorded on the abutting first and second portions of said recording medium.

8. An ink jet recording apparatus for recording a prescribed pattern on a recording medium comprising:

first means for directing a first stream of ink droplets toward said recording medium and for controllably deflecting said first stream of ink droplets in a first angular direction so as to cause the ink droplets in said first stream to be deposited on only a first portion of said recording medium; and second means for directing a second stream of ink droplets toward said recording medium and for controllably deflecting said second stream of ink droplets in a second angular direction, opposite said first angular direction, so as to cause the ink droplets in said second stream to be deposited on only a second portion of said recording medium; and wherein the deflection of said first and second streams of ink droplets controlled by said first and second means, respectively, is such that an edge of the pattern formed by the deposited ink droplets of said first stream on said first portion of said recording medium abuts an edge of the pattern formed by the deposited ink droplets of said second stream on said second portion of said recording medium, and said first and second streams of ink droplets are deflected in such a manner that those ink droplets of said first stream which have been controllably deflected by said first means through the smallest angle of deflection for said first stream are deposited along said edge of the pattern formed in said first portion of said recording medium, and those ink droplets of said second stream which have been controllably deflected by said second means through the smallest angle of deflection for said second stream are deposited along said edge of the pattern formed on said second portion of said recording medium.

9. An ink jet recording apparatus according to claim 7, wherein each of said first and second means respectively includes a record head which comprises an ink jet nozzle for emitting a stream of ink droplets, and deflection means for causing the deflection of the stream of ink droplets emitted by said ink jet nozzle, and wherein the record heads of said first and second means are arranged such that the ink droplets of said first and second streams are deposited along a line on said recording medium.

10. An ink jet recording apparatus according to claim 8, wherein each of said first and second means respectively includes a record head which comprises an ink jet nozzle for emitting a stream of ink droplets, and deflection means for causing the deflection of the stream of ink droplets emitted by said ink jet nozzle, and wherein the record heads of said first and second means are arranged such that the ink droplets of said first and second streams are deposited along respective staggered lines on said recording medium.

* * * * *